United States Patent
Stuart

(10) Patent No.: US 10,316,932 B2
(45) Date of Patent: Jun. 11, 2019

(54) SHAFT ASSEMBLY WITH INTERNAL UV-CURED BALANCE WEIGHT

(71) Applicant: American Axle & Manufacturing, Inc., Detroit, MI (US)

(72) Inventor: Charles G. Stuart, Rochester Hills, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 223 days.

(21) Appl. No.: 15/402,555

(22) Filed: Jan. 10, 2017

(65) Prior Publication Data

US 2018/0195578 A1 Jul. 12, 2018

(51) Int. Cl.
- F16F 15/32 (2006.01)
- F16C 3/02 (2006.01)
- G01M 1/36 (2006.01)

(52) U.S. Cl.
CPC .............. F16F 15/322 (2013.01); F16C 3/02 (2013.01); G01M 1/36 (2013.01); *F16C 3/026* (2013.01)

(58) Field of Classification Search
CPC ........... F16F 15/322; F16C 3/02; F16C 3/026; G01M 1/36; B05B 7/228; B05B 13/06
See application file for complete search history.

(56) References Cited

U.S. PATENT DOCUMENTS

| | | | |
|---|---|---|---|
| 4,895,551 A * | 1/1990 | Fritz | F16C 3/026 464/180 |
| 5,393,802 A | 2/1995 | Horikawa | |
| 6,128,952 A | 10/2000 | LeBlanc | |
| 6,619,119 B1 | 9/2003 | Duggan et al. | |
| 6,701,802 B2 | 3/2004 | Bogen | |
| 6,811,633 B1 | 11/2004 | Myers | |
| 2003/0157988 A1* | 8/2003 | Nonogaki | F16C 3/026 464/181 |
| 2004/0180726 A1 | 9/2004 | Freeman et al. | |
| 2010/0326352 A1* | 12/2010 | Hart | B05B 13/06 118/317 |
| 2016/0123405 A1* | 5/2016 | Feichter | F16F 15/1442 464/127 |
| 2017/0261066 A1* | 9/2017 | Springer | F16C 3/20 |
| 2018/0038762 A1 | 2/2018 | Gilmore et al. | |

* cited by examiner

*Primary Examiner* — Joseph S Del Sole
*Assistant Examiner* — Emmanuel S Luk
(74) *Attorney, Agent, or Firm* — Harness, Dickey & Piece, P.L.C.

(57) ABSTRACT

A method for forming a shaft assembly includes: providing a shaft structure, the shaft structure comprising a shaft and a universal joint member that is coupled to an end of the shaft; inserting a weight member to the shaft structure to form an intermediate assembly, the weight member being formed at least partly from a liquid resin, the intermediate assembly having an initial rotational unbalance; rotating the intermediate assembly about a longitudinal axis of the shaft structure to re-distribute a least a portion of the weight member circumferentially about the shaft structure to at least partly attenuate the initial rotational unbalance; and curing the liquid resin while rotating the intermediate assembly to fix the re-distributed portion of the weight member to the shaft structure to thereby form a balance weight that at least partly attenuates the initial rotational unbalance. A shaft assembly is also provided.

6 Claims, 3 Drawing Sheets

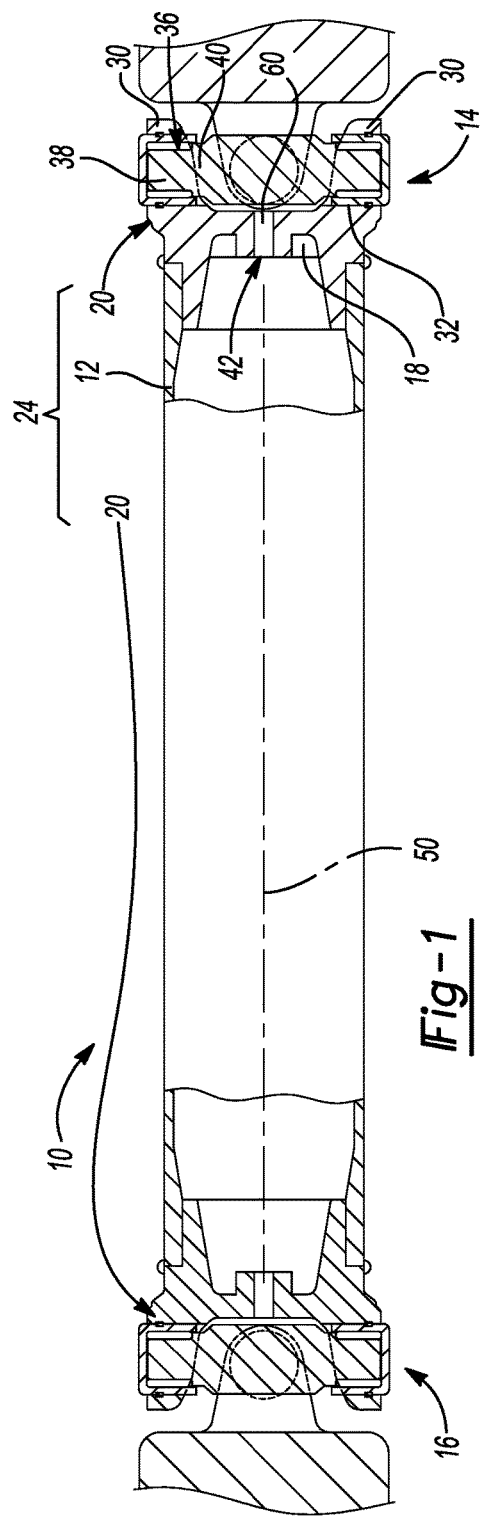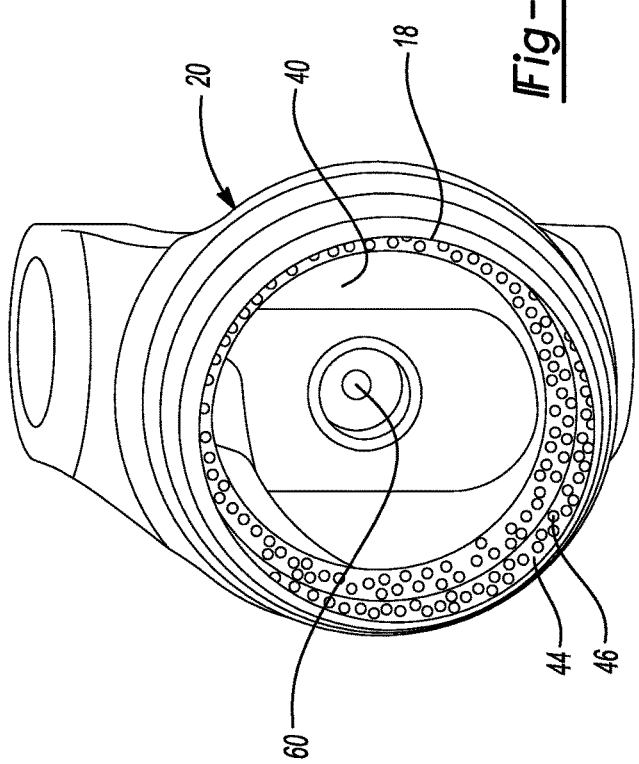

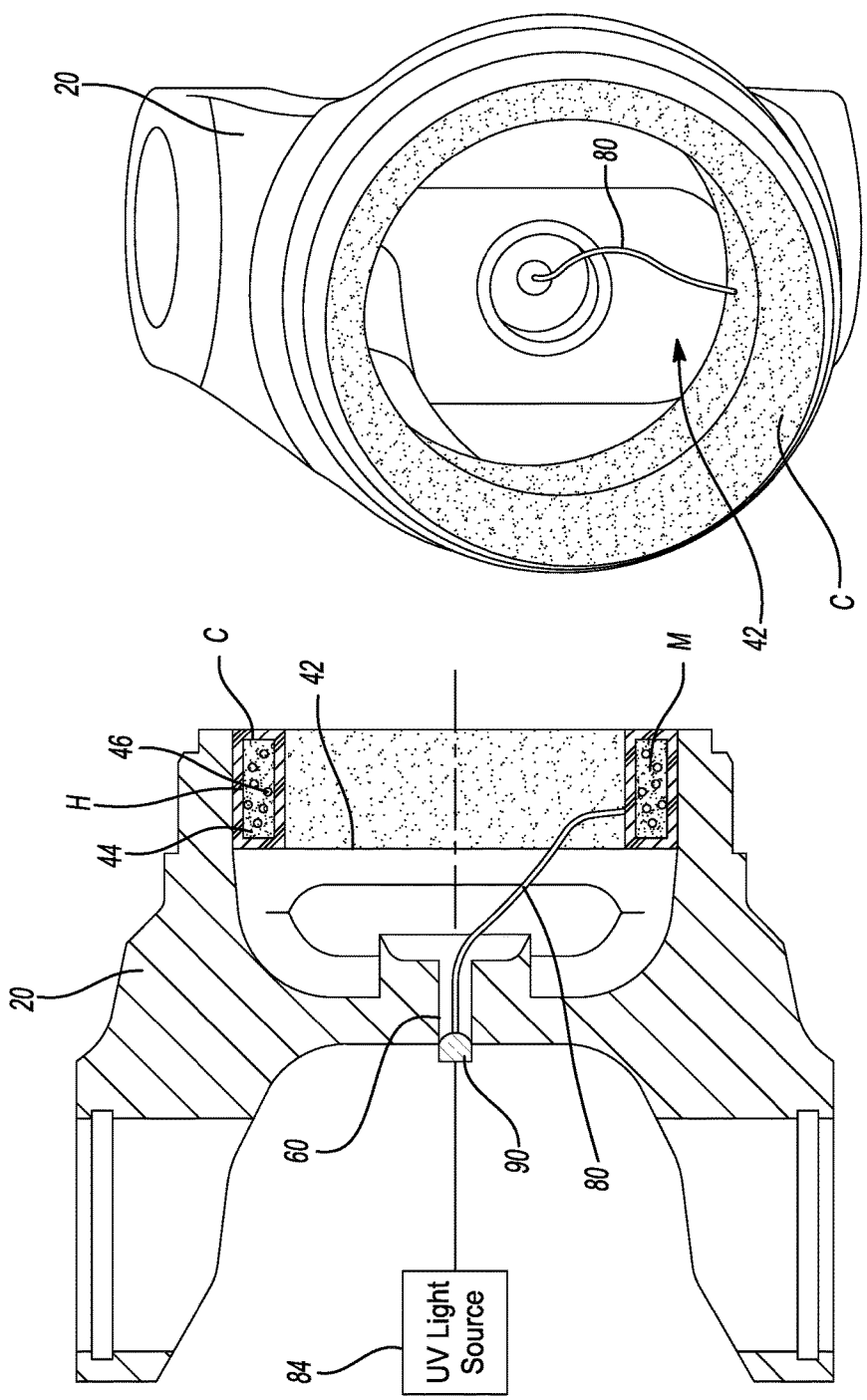

SHAFT ASSEMBLY WITH INTERNAL UV-CURED BALANCE WEIGHT

FIELD

The present disclosure relates to shaft assembly with an internal balance weight and a related method for forming the shaft assembly.

BACKGROUND

This section provides background information related to the present disclosure which is not necessarily prior art.

Various shafts assemblies, such as propshafts used in the automotive industry to transmit rotary power from a powertrain to an axle or transfer case, must be rotationally balanced so that undesired vibration is not generated during the use of the shaft assembly. In the production of modern automotive propshafts, it is common practice to weld an appropriately sized balance weight to a portion of the propshaft to minimize unbalance. This solution, however, is known to suffer from several drawbacks.

For example, it is desirable to form automotive propshafts from increasingly thinner-walled tubing in an effort to reduce the cost and mass of the propshaft. The welding of balance weights to such thin-walled tubing, however, requires more precise control of the welding operation and moreover, may create stress-risers in the tubing.

Accordingly, there remains a need in the art for an improved rotationally balanced shaft assembly and for an improved method for forming a rotationally balanced shaft assembly.

SUMMARY

This section provides a general summary of the disclosure, and is not a comprehensive disclosure of its full scope or all of its features.

In one form, the present teachings provide a method for forming a shaft assembly. The method includes: providing a shaft structure, the shaft structure comprising a shaft and a universal joint member that is coupled to an end of the shaft; inserting a weight member to the shaft structure to form an intermediate assembly, the weight member being formed at least partly from a liquid resin, the intermediate assembly having an initial rotational unbalance; rotating the intermediate assembly about a longitudinal axis of the shaft structure to re-distribute a least a portion of the weight member circumferentially about the shaft structure to at least partly attenuate the initial rotational unbalance; and curing the liquid resin while rotating the intermediate assembly to fix the re-distributed portion of the weight member to the shaft structure to thereby form a balance weight that at least partly attenuates the initial rotational unbalance.

In another form, the present teachings provide a shaft assembly that includes a shaft structure and a balance weight. The shaft structure has a shaft and a universal joint member coupled to an end of the shaft and defines a hollow interior zone. The balance weight is received in the hollow interior zone and is fixedly coupled to the shaft structure. The balance weight is at least partly formed of a cured resin and is non-uniformly distributed in a circumferential direction about a longitudinal axis of the shaft structure. The balance weight is configured to reduce a rotational unbalance of the shaft structure about a longitudinal axis of the shaft structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side elevation view in partial section of an exemplary shaft assembly constructed in accordance with the teachings of the present disclosure;

FIG. 2 is perspective view of a portion of the shaft assembly of FIG. 1 illustrating a balance weight mounted in a universal joint member;

FIG. 5 is a view similar to that of FIG. 3 but depicting an alternate embodiment in which a cartridge is assembled to the shaft structure, the cartridge including a housing that holds a liquid resin; and FIG. 6 is a perspective view of a portion of the alternate embodiment of FIG. 5 illustrating a balance weight mounted in a universal joint member.

Corresponding reference numerals indicate corresponding parts throughout the several views of the drawings.

DETAILED DESCRIPTION

Figure 3:
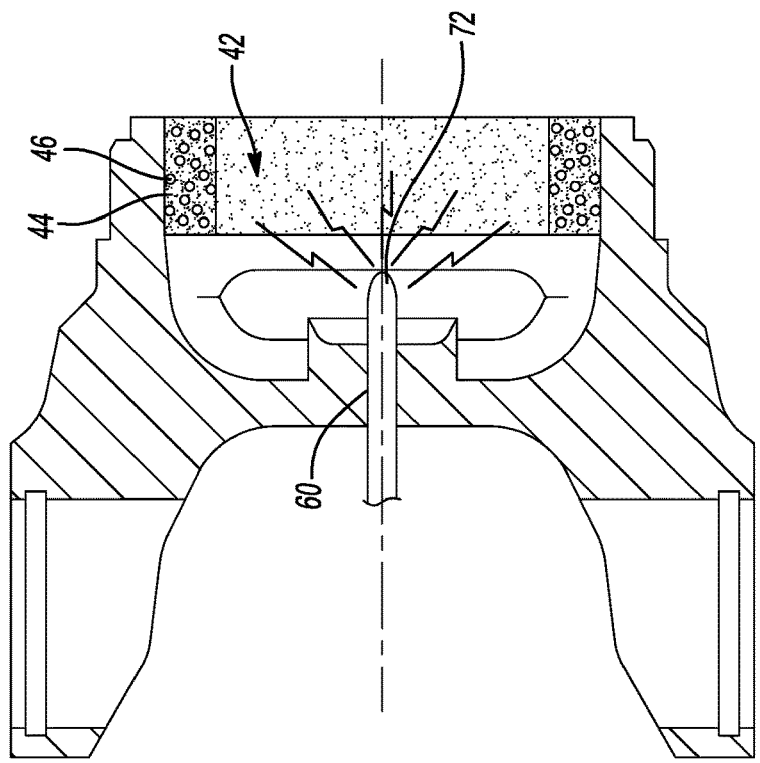
FIG. 3 is a longitudinal section view of a portion of a shaft assembly depicting a nozzle for injecting a liquid resin material into a shaft structure.

With reference to FIG. 1 of the drawings, an exemplary shaft assembly constructed in accordance with the teachings of the present disclosure is generally indicated by reference numeral 10. The shaft assembly 10 can be any type of shaft assembly that is configured to transmit rotary power, but in the particular example provided, the shaft assembly 10 is a propshaft that is employed in a vehicle driveline to transmit propulsive rotary power.

The shaft assembly 10 can include a shaft member 12, first and second universal joints 14 and 16, respectively, and one or more balance weights 18. Only one balance weight 18 is shown in the example provided, but it will be appreciated that one or more of the balance weights 18 can be employed where unbalance correction is desired, such as at the opposite ends of the shaft assembly 10. Except as noted herein, the shaft member 12 and the first and second universal joints 14 and 16 can be constructed in a conventional manner and as such, a detailed discussion of these components is not needed herein. Briefly, the shaft member 12 can be a tubular structure that can be formed of an appropriate material, such as steel, aluminum, carbon fiber, etc. The first and second universal joints 14 and 16 can be configured to permit relative movement between the driveline components while transmitting rotary power. For example, the first and second universal joints 14 and 16 can be Cardan joints, or can be a type of constant velocity joint. Each of the first and second universal joints 14 and 16 can include a universal joint member 20 that can be fixedly coupled to the shaft member 12 to form a shaft structure 24.

In the particular example provided, each of the first and second universal joints 14 and 16 is a Cardan joint, and the universal joint members 20 are yokes that are fixedly coupled (e.g., via welding) to the shaft member 12 to form the shaft structure 24. Each of the yokes can comprise a pair of arms 30 having a hole 32 formed there through. The holes 32 in the arms 30 are conventionally configured to receive bearing assemblies 36 therein that support the trunnions 38 of a cross-shaft 40.

With reference to FIGS. 1 and 2, the balance weight 18 can be received into a hollow interior zone 42 in the assembly 10 and can be fixedly coupled to the shaft structure 24 for rotation therewith. The hollow interior zone 42 could be disposed entirely within the hollow interior of the shaft member 12, could be disposed entirely within an associated one of the universal joint members 20, or could be disposed within both the shaft member 12 and one or both of the universal joint members 20.

The balance weight 18 can be at least partially formed of a cured resin 44 and can optionally comprise particles 46 that are formed of a material having a density that is greater than a density of the cured resin 44. In the example provided, the balance weight 18 includes steel particles 46 that are spherically shaped and have a density that is approximately 6 to 8 times that of the cured resin 44. It will be appreciated, however, that the particles 46 could be formed of one or more different materials, and/or could be formed of two or more sizes, and/or could be formed of one or more shapes, and/or that one or more of the shape could be a non-spherical shape. The balance weight 18 can be non-uniformly distributed in a circumferential direction about a longitudinal axis 50 of the shaft structure 24 so as to reduce a rotational unbalance of the shaft structure 24 about its longitudinal axis 50.

The material that forms the balance weight 18 can be installed to the hollow interior zone 42 prior to or after one or both of the universal joint members 20 have been fixedly coupled to the shaft member 12. For example, material (i.e., a liquid comprising an uncured resin 44 with the optional higher-density particles 46 mixed therein) can be injected into the hollow interior zone 42. The shaft structure 24, with or without the entirety of the first universal joint 14 (FIG. 1) and/or the second universal joint 16 (FIG. 1), can be rotated about its longitudinal axis 50 at a speed that is within a predetermined rotational speed range to re-distribute the material, and the re-distributed material can be cured while the shaft structure 24 is being rotated to thereby form the balance weight 18. It will be appreciated that rotation of the shaft structure 24 while the uncured resin is in a liquid state will permit portions of the material, including the higher density particles 46 if employed, to re-distribute in a circumferential direction in a manner that reduces the rotational unbalance of the shaft structure 24 about its longitudinal axis 50. Accordingly, curing the liquid resin 44 after re-distribution of the material in the circumferential direction locks the material (i.e., the resin and if included, the higher density particles 46) into an orientation relative to the shaft structure 24 that maintains the reduced rotational unbalance that was obtained prior to the curing of the liquid resin 44.

Figure 4:
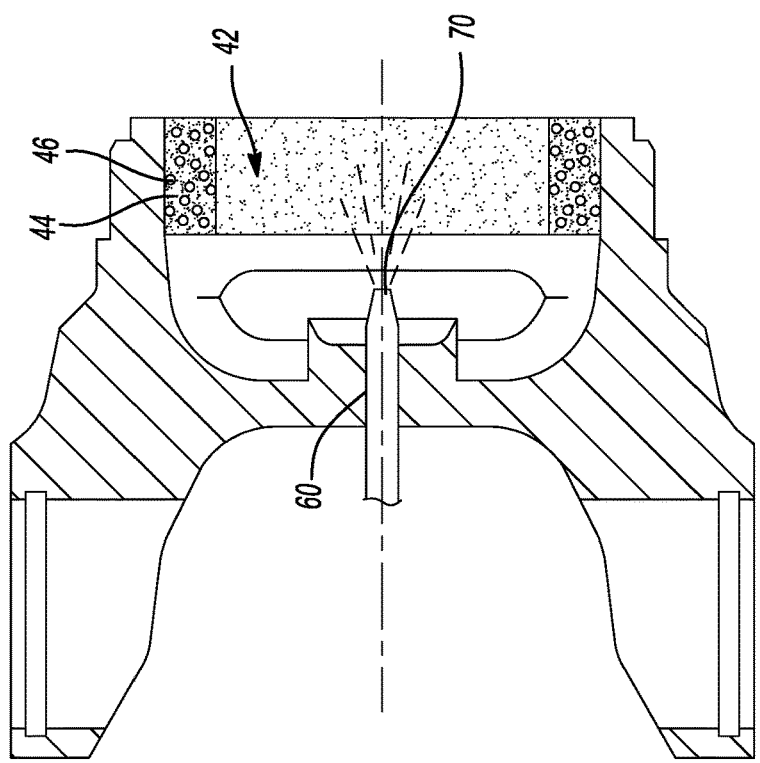
FIG. 4 is a view similar to that of FIG. 3 but depicting a light source received into the shaft structure to cure the liquid resin material.

To expedite curing of the liquid resin 44, ultra-violet (UV) light may be employed. UV light could be introduced to the hollow interior zone through any convenient means, such as through a hole 60 formed through a universal joint member 20 that is disposed along the longitudinal axis 50 of the shaft structure 24. The hole 60 could also be employed to introduce the material to the hollow interior zone 42. With reference to FIG. 3, a nozzle 70 can be inserted through the hole 60 and the material can be pumped through the nozzle 70 to introduce the material to the hollow interior zone 42. Thereafter, and once the material has been re-distributed, a UV light source 72 (FIG. 4) can be translated through the hole 60 into the hollow interior zone 42 so that UV light from the UV light source 72 (FIG. 4) can expedite the curing of the liquid resin 44 in the material.

With reference to FIGS. 5 and 6, a filament 80 that is formed of a material that is capable of transmitting UV light there through, such as a fiber-optic material, can be employed to facilitate the transmission of UV light into the hollow interior zone 42. The filament 80 can have a relatively small diameter, thread-like structure that can receive UV light from a UV light source 84 that is located outside the shaft structure 24 and transmit the UV light to the liquid resin 44 in the hollow interior zone 42 to facilitate expedited curing of the liquid resin 44. Optionally, a lens 90 can be coupled to the universal joint member 20 and can collect the UV light and transmit the UV light to the filament 80. In the example provided, the lens 90 is received in the hole 60 and is fixedly coupled to both the universal joint member 20 and the filament 80.

If desired, the material M (i.e., the liquid resin 44 and the higher density particles 46, if any) can be disposed in a cartridge C that can be assembled to the universal joint member 20 or the shaft member 12 (FIG. 1) prior to the coupling of the universal joint member 20 to the shaft member 12 (FIG. 1). For example, the cartridge C can include a housing H, which can be shaped as a hollow ring torus or an annular or cylindrical plinth, and the material M (i.e., the liquid resin 44 with the heavier density particles 46 if included), can be received into the housing H. The housing H can be formed of a material that permits UV light to be transmitted there through, such as a transparent plastic material, and can be secured to the shaft member 12 and/or the universal joint member 20 in any desired manner, such as via a press-fitting and/or adhesive bonding. If a filament 80 is to be employed, the filament 80 could be optionally fixedly coupled to the housing H.

The above method and balance weight permit the shaft assembly 10 to be rotationally balanced without affecting the exterior surface of the shaft assembly 10. Accordingly, it would be possible to rotationally balance the shaft assembly 10 after the shaft assembly 10 has been coated with a substance, such as paint, that would otherwise interfere with the welding of a balance weight to an exterior surface of the shaft assembly 10. Moreover, in the event that the above method is not successful in entirely reducing the rotational unbalance of the shaft structure within predetermined limits, another rotational balancing method, such as the welding of balance weights to an exterior surface of the shaft structure 24, could be employed.

While the method for forming the shaft assembly 10 has been described as employing physical forces attendant to the rotation of the shaft structure 24 about its longitudinal axis 50, it will be appreciated that a magnetic field or other means could be employed to move the higher density particles about the circumference of the shaft structure 24 to attenuate the initial rotational unbalance of the shaft structure 24. If a magnetic field is employed in addition to the physical forces attendant to the rotation of the shaft structure 24, the magnetic field would need to be tailored to the unbalance in its shape, magnitude and orientation relative to the shaft structure 24.

Moreover, while the above method and balance weight 18 have been described as being received into a hollow interior zone of the shaft assembly 10, it will be appreciated that the balance weight 18 (and more particularly the embodiment of the balance weight 18 that includes the housing—) can be fixedly mounted to an exterior surface of the shaft structure 24 so that it is not necessary to transmit UV light into the interior of the shaft structure 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a shaft assembly, the method comprising:
   providing a shaft structure, the shaft structure comprising a shaft and a universal joint member that is coupled to an end of the shaft;
   inserting a weight member to the shaft structure to form an intermediate assembly, the weight member being formed at least partly from a liquid resin, the intermediate assembly having an initial rotational unbalance;
   rotating the intermediate assembly about a longitudinal axis of the shaft structure to re-distribute a least a portion of the weight member circumferentially about the shaft structure to at least partly attenuate the initial rotational unbalance; and
   curing the liquid resin while rotating the intermediate assembly to fix the re-distributed portion of the weight member to the shaft structure to thereby form a balance weight that at least partly attenuates the initial rotational unbalance.

2. The method of claim 1, wherein curing the re-distributed portion of the weight member comprises transmitting ultra-violet light into the shaft structure.

3. The method of claim 2, wherein a filament is received through the shaft structure and wherein the ultra-violet light is transmitted into the shaft structure through the filament.

4. The method of claim 3, wherein the filament is disposed axially along the longitudinal axis of the shaft structure and through the universal joint member.

5. The method of claim 1, wherein the weight member comprises particles formed of a material having a density that is greater than a density of the liquid resin.

6. The method of claim 5, wherein the particles are formed of steel.

* * * * *